Oct. 22, 1974　　　　J. D. ZEFF　　　　3,843,521
DOMESTIC WATER PURIFICATION METHOD AND SYSTEM
Filed Oct. 14, 1972

United States Patent Office 3,843,521
Patented Oct. 22, 1974

3,843,521
DOMESTIC WATER PURIFICATION METHOD
AND SYSTEM
Jack D. Zeff, Deerfield, Ill., assignor to Inca-One
Corporation, Los Angeles, Calif.
Filed Aug. 14, 1972, Ser. No. 280,552
Int. Cl. C02b 3/08
U.S. Cl. 210—138
8 Claims

ABSTRACT OF THE DISCLOSURE

A water purification system utilizing a domestic blender and an associated ozone generator assembly. Ozone is generated and introduced into the blender container and is drawn into the vortex and the adjacent zone of high agitation efficiently, effectively and rapidly, to purify and to disinfect small quantities of water for use for drinking and cooking. The ozone generator assembly is adapted to be mounted on the blender container.

---

This invention relates to a domestic system for, and method of water purification. It makes it possible for a householder to purify and disinfect relatively small quantities of impure water for drinking and cooking purposes without the necessity of employing chemical, boiling or filtering treatments.

Presently, a wide variety of water purification and disinfecting methods are employed for commercial and municipal use. Many of these methods require the use of chemicals, such as chlorine. In Europe, ozone is widely used to treat impure water and ozone is used by many bottled-water companies in the United States both to disinfect water and to remove trace organic materials. Ozone is effective both to destroy microorganisms and to remove taste and odor constituents.

Commercial and municipally used methods of water purification are not readily adapted to household or home use. For that reason, the most common home method of purifying water employs the procedure of boiling or distilling the impure water for a predetermined period of time. Thereafter the water must be refrigerated or must be allowed to cool for an extended period of time before it is usable for drinking purposes. Other home methods utilize filters requiring periodic replacement of active materials, such as activated charcoal, diatomaceous earth, and the like.

In accordance with this invention, a practical and simple procedure for purifying and disinfecting water in the home is provided and one in which boiling, the utilization of chemical purifying additives or filters or the like are avoided. The system of this invention utilizes ozone and provides an expedient and rapid method for introducing it into water to be purified.

The system of this invention contemplates the adaptation of any of a wide variety of kitchen blenders with an ozone generating assembly in which small quantities of ozone are generated and introduced into the mixing jar or container of such a blender. When the mixing blades of the blender are rotated, a vortex and an adjacent zone of great agitation are generated in the water, and ozone is drawn into the vortex and zone for intimate mixture with the water, thereby to purify the water and to eliminate impurities in the water. Water purified in accordance with this system and method is safe to drink and can be made substantially as pure as bottled water is normally expected to be.

The literature indicates that ozone is effective to destroy bacteria and viruses, and indeed that it is more effective than is chlorine for that purpose, both in terms of absolute effectiveness and in terms of the speed with which it acts upon such organisms. Further, the literature indicates that ozone rapidly oxidizes organic impurities which sometimes yield undesirable taste and odor constituents in water, impurities which chlorine frequently will not attack. Accordingly, the ozone treatment contemplated by this invention both purifies and disinfects impure water, and much more effectively and quickly than would a treatment with chemicals such as chlorine.

An ozone generating assembly of this invention need only produce relatively small quantities of ozone, in part because only relatively small quantities of water are to be treated. An ozone generator assembly of this invention may therefore incorporate a small ultraviolet lamp and appropriate switch means. Preferably, the switch means is a timing switch so that preselected time periods of operation may be selected depending upon the degree of impurity of the water to be treated.

Preferably, the ozone generator is mounted in a suitable housing which is adapted to be mounted on an open-topped mixing jar or container of a variable speed blender. A suitable blender may comprise a housing mounting a motor and a drive gear. The blender container or jar mounts mixing blades at its base which are connected to a driving gear. When the container is seated on the blender housing, the drive gear and driving gear mesh so that when the motor is energized, the mixing blades will rotate.

The open-topped blender container is enclosed at its top by a removable cap, preferably having a central aperture. The cap aperture is proportioned to mount and seat the ozone generator housing so that the ozone may flow directly from the ozone generator into the top of the container.

In a preferred embodiment, the mixer container is provided with a plurality of generally vertical internal flutes and the mixing blades are driven at speeds of from about 3,500 to about 23,000 revolutions per minute. Under such circumstances, when water is introduced into the container and the mixing blades are driven, a vortex, as of a whirlwind shape, is created and a zone of great agitation adjacent the vortex results. The vortex creates a slight negative pressure, thereby drawing the ozone-in-air mixture downwardly into the vortex to provide intimate contact with the water of a large surface area. The rapid mixing and swirling action also creates a large number of very small-sized bubbles, thereby to enhance the speed of mixing of the ozone with the water, hence the speed with which the water is purified. The great agitation adjacent the vortexx not only tends to draw the bubbles into the wate more rapidly, but also tends more completely to draw the ozone into the water to produce the maximum oxidizing effect with a minimum concentration of ozone.

After the ozone contacts the water and the oxidizable constituents in the water, the ozon partially disassociates to oxygen which, when it escapes the water, returns, as by convection, to the ultraviolet lamp where it is again irradiated to form ozone.

A selected cycle of operation, i.e., the timing and the mixing speed, will depend upon the type of contamination in the water. Once these variables have been determined for a given source of water, the cycle of operation may be selected for mixing and ozonation, thereby to provide a consistent quality of water with each use of the system.

These and other advantages and features of this invention will become apparent from the following description and drawings, of which:

Figure 1:
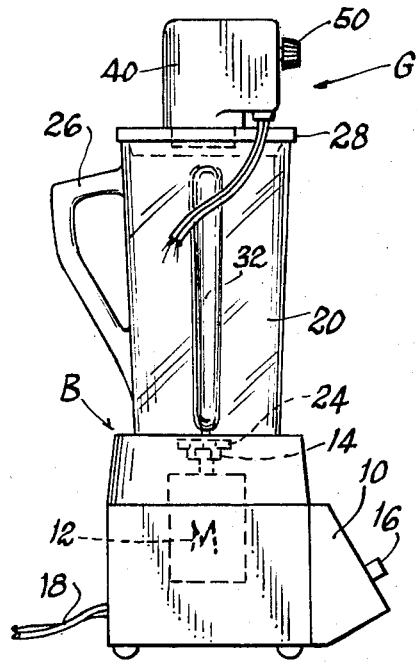
FIG. 1 is a side elevational view illustrating a household water purification system embodying the principles of this invention.
Figure 2:
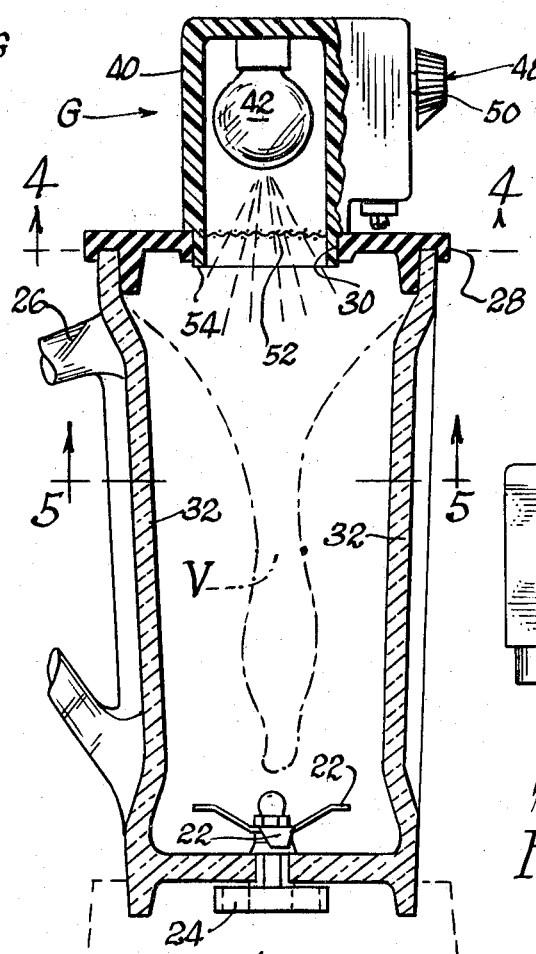
FIG. 2 is an enlarged view, partially in section, of the system of FIG. 1.
Figure 3:
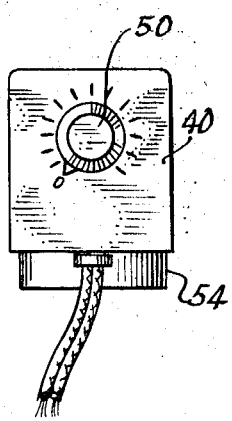
FIG. 3 is a side elevational view of the ozone generator assembly of FIG. 2.
Figure 5:
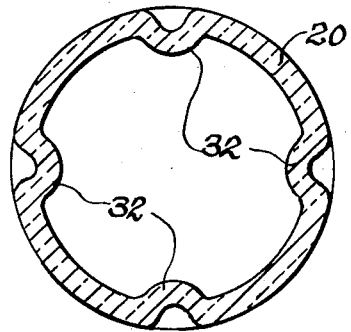
FIG. 5 is a cross-sectional view taken substantially along the line 5—5 of FIG. 2.
Figure 6:
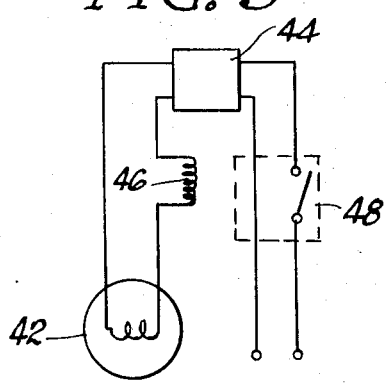
FIG. 6 is a circuit diagram of the ozone generator system of FIG. 1.
Figure 4:
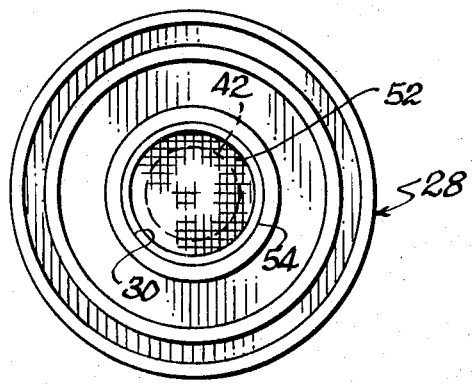
FIG. 4 is a cross-sectional view taken substantially along the line 4—4 of FIG. 2.

Referring now to FIG. 1, a household water purification system of this invention includes a blender assembly B and ozone generator assembly G removably connected to the blender assembly. The blender assembly B includes a portable housing 10 which mounts an electric motor 12, a gear 14 and appropriate speed control and on-off switch assembly 16. The speed control and on-off switch assembly may be any suitable switch assembly that provides for selecting the operating speed of the impeller and which will provide for speeds at least from about 3,500 to about 23,000 revolutions per minute of the mixer blades. Conductors 18 provide a suitable power supply. Blender housing 10 is adapted to be seated upon a kitchen counter top, and mounts and supports an open-topped mixer container or jar 20 which rotatably mounts an internal impeller or mixer comprising a plurality such as four mixer blades 22 at its base and an external impeller gear 24. Impeller gear 24 is proportioned to mesh with gear 14, thereby to couple the motor with the impeller in the container, when container 20 is seated upon housing 10. Container 20 typically may contain up to about 64 ounces of liquid, although purification of water in conventionally available domestic blenders most efficiently occurs about one quart at a time.

Container 20 also mounts a suitable handle 26 and a suitable removable cap 28. Cap 28 defines a central opening 30 through which ozone may pass into the container. Cap 28 serves removably to mount the generator assembly G to the blender assembly. The blender jar is preferably fluted, defining a plurality of internal spaced, generally vertical flutes 32. Flutes 32 cooperate with the mixer blades to generate a vortex of whirlwind shape to increase the agitation of the water in the container, thereby to enhance the rapidity with which mixing operations occur. In this case, ozone generated and introduced into vortex and into the surrounding zone of high agitation defining the whirlwind shaped vortex is more rapidly mixed with the water thereby to purify the water more efficiently and rapidly. A schematic representation of a typical vortex is indicated at V.

A portable ozone generating assembly of this invention comprises a housing 40 which is adapted to provide a sheath for surrounding an ozone generating means, such as an ultraviolet ozone generating lamp 42, and which is further proportioned to mount a transformer ballast 44, an overvoltage resistance lamp 46 and a control switch and timer assembly 48 which is operated by a control knob 50. The switch and timer assembly 48 may be any conventional switch and timer assembly which will both energize ozone generating lamp 42 and select a predetermined operating time period or interval such as, for example, from between zero and five minutes.

A preferred ozone producing lamp is an ultraviolet germicidal lamp such as a Sylvania G4S11 lamp having a rated power input of four watts. The transformer ballast used was rated at 120 volts and ten watts, and the overvoltage resistance lamp was a No. 55 bulb. Such a lamp produces small quantities of ozone which, because of the use of the assembly of this invention, is made efficient use of.

To prevent droplets of water from contacting the lamp accidentally, which might result in its breakage, a baffle 52 is provided mounted in housing 40 below lamp 42. Baffle 52 may comprise a 16 mesh stainless steel screen positioned slightly above the bottom of the housing 40.

Preferably, housing 40 is dimensioned at its base to be seated within opening 30 in cap 28. To that end, a housing mounting segment 54 is configured to be press fit into opening 30 and is dimensioned to seal the opening 30 thereat. Cap 28 and housing 40 are adapted to be separated, if desired. When separated, cap 28 may be closed by a suitable plug for use as a conventional blender container cover.

When the timer and switch assembly 48 is operated via knob 50, ozone generator 42 produces ozone which is then conveyed through housing 40 to be introduced into the container above the water. The ozone is then drawn into the vortex generated by the mixer blades 22 in cooperation with the fluted container 20, and into the water in the zone of great agitation adjacent the vortex. When an impeller comprising four mixer blades 22 is used they are desirably driven at a speed of from about 3,500 to about 23,000 revolutions per minute. However, greater or lesser speeds may be used as well.

The ozone-in-air mixture introduced into the vortex, because of the action of the impeller and of the great agitation of the water in the zone, is broken down into very small bubbles for intimate mixture of the ozone with the water thereby to act upon the biological and organic impurities in the water to disinfect and purify the water and to render impure water potable. It is believed that the high speed impeller blades 22 cooperate with the water and with the ozone to create a liquid-ozone-in-air emulsion at the zone adjacent the vortex, particularly where the container is fluted, to speed the purification process. The efficiency with which the blender mixes the ozone-in-air mixture with the water makes it possible to utilize small quantities of ozone and yet to obtain a maximum disinfecting and purifying effect therefrom. The efficiency is enhanced when the cap 28 is press fit to the container 20 and when the housing is sealed in the opening 30, as by segment 54, thereby confining the ozone in the container so that substantially all of it is available for mixture with the water.

It should also be noted that the ultraviolet lamp disinfects the air in the container which is exposed to the ultraviolet rays, thereby destroying a number of commonly present microorganisms. As such, the air-in-ozone mixture introduced into the water to be purified is also disinfected to some extent.

Although a presently preferred embodiment of this invention has been described, variations within the spirit and scope of this invention are possible and will become apparent to those skilled in the art from the foregoing description and drawings. For example, an ozone generating assembly may be used from which the ozone may be conveyed, as by a tube, from a remote source into the water to be treated in a blender container. Further, other known ozone generating sources than an ultraviolet lamp may be used to produce the small quantities necessary for use in accordance with this invention. Accordingly the scope of this invention is intended to be limited only in accordance with the claims.

What is claimed is:

1. A household ozone generator and purification system for the purification of small quantities of impure water comprising a housing, an ozone generator mounted in said housing, means secured to said housing for energizing the ozone generator for preselected time intervals, an open topped container having an impeller adjacent its base, a cap for said open top, said cap defining an opening therein, and means for mounting said housing on said cap to permit ozone to flow through said cap and into said container, whereby when said impeller is rotated and ozone is geenrated and flows into said container, impure water is purified.

2. a household ozone generator and purification system for the purification of small quantities of impure water in accordance with claim 1, wherein said ozone generator is an ultraviolet lamp.

3. A household ozone generator and purification system for the purification of small quantities of impure water in accordance with claim 2 further comprising a baffle mounted between the lamp and the container in said housing to prevent water droplets from contacting said lamp.

4. A household ozone geenrator and purification system for the purification of small quantities of impure water in accordance with claim 3 in which said baffle is a mesh screen.

5. A household ozone generator and purification system for the purification of small quantities of impure water in accordance with claim 1 in which said cap is removable and defines an opening therein in which said housing is removably mounted.

6. A household ozone generator and purification system for the purification of small quantities of impure water in accordance with claim 5 in which said container defines vertically oriented internal flutes adapted to cooperate with said impeller to generate a vortex of whirlwind shape in said container when said impeller is rotated.

7. A household ozone generator and purification system for the purification of small quantities of impure water in accordance with claim 5 in which said impeller comprises a plurality of mixer blades.

8. A system for the household purification of impure water with ozone comprising a portable housing mounting an electric motor and first gear means and adapted to be seated on a kitchen counter top, a container adapted to be seated on said housing and said container mounting a removable cap defining an opening, mixer blades in said container and second gear means below said container positioned to be coupled to said first gear means when said container is seated on said housing to couple said mixer blades to said motor to be driven thereby, and an ozone generator assembly comprising an ultraviolet lamp and a removably connected housing member surrounding said ultraviolet lamp and connected to said cap at said opening for conveying ozone directly from said ultraviolet lamp into said container above said mixer blades.

References Cited
UNITED STATES PATENTS

| | | | |
|---|---|---|---|
| 3,500,041 | 3/1970 | Kassing | 21—102 RX |
| 2,565,426 | 8/1951 | Hayes, Jr. | 21—102 R |
| 3,589,862 | 6/1971 | Veloz | 21—102 R |
| 2,889,837 | 6/1959 | Braun et al. | 134—25 A |
| 3,309,159 | 3/1967 | Le Sueur et al. | 21—102 RX |
| 3,726,404 | 4/1973 | Troglione | 210—192 X |
| 3,240,246 | 3/1966 | Dewenter | 259—107 X |
| 2,546,949 | 3/1951 | Morrison, Jr. | 259—DIG 25 |
| 3,336,099 | 8/1967 | Czulak et al. | 210—63 X |
| 3,650,950 | 3/1972 | White | 210—63 X |
| 3,682,314 | 8/1972 | Blatter | 210—63 X |

OTHER REFERENCES

"Rival's SCR Blender," Appliance Manufacturer, February 1966, pp. 93–94.

JOHN ADEE, Primary Examiner

R. H. SPITZER, Assistant Examiner

U.S. Cl. X.R.

21—102 R; 210—192, 205; 259—1 R; 261—84, DIG 42